United States Patent
Oshiro

(10) Patent No.: US 10,377,441 B2
(45) Date of Patent: Aug. 13, 2019

(54) THROTTLE GRIP APPARATUS

(71) Applicant: ASAHI DENSO CO., LTD., Hamamatsu-shi, Shizuoka (JP)

(72) Inventor: Yukio Oshiro, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 111 days.

(21) Appl. No.: 15/827,643

(22) Filed: Nov. 30, 2017

(65) Prior Publication Data

US 2018/0154975 A1    Jun. 7, 2018

(30) Foreign Application Priority Data

Dec. 1, 2016   (JP) .................................. 2016-234402
Dec. 1, 2016   (JP) .................................. 2016-234403

(51) Int. Cl.
| | | |
|---|---|---|
| *B62K 23/04* | (2006.01) | |
| *F02B 61/02* | (2006.01) | |
| *F02D 11/02* | (2006.01) | |
| *F02D 11/10* | (2006.01) | |

(52) U.S. Cl.
CPC .............. *B62K 23/04* (2013.01); *F02B 61/02* (2013.01); *F02D 11/02* (2013.01); *F02D 11/106* (2013.01); *F02D 2011/101* (2013.01)

(58) Field of Classification Search
CPC ... B62K 23/04; B62K 23/00; F02D 2011/101; F02D 11/02; F02D 11/106; F02D 11/04; F02B 61/02; F02B 61/06
See application file for complete search history.

(56) References Cited

U.S. PATENT DOCUMENTS

| | | | | |
|---|---|---|---|---|
| 2011/0132128 A1* | 6/2011 | Sato | ....................... | B62K 23/04 74/489 |
| 2013/0255432 A1* | 10/2013 | Nomura | ................... | G05G 1/10 74/504 |
| 2016/0194049 A1* | 7/2016 | Jing | ...................... | B62K 23/04 74/504 |

FOREIGN PATENT DOCUMENTS

| | | |
|---|---|---|
| EP | 2 578 485 A1 | 4/2013 |
| EP | 2 644 491 A1 | 10/2013 |
| JP | 2010-088154 A | 4/2010 |
| JP | 2015-081564 A | 4/2015 |

OTHER PUBLICATIONS

Extended European Search Report issued in Patent Application No. EP 17 20 4930 dated Apr. 10, 2018.

* cited by examiner

*Primary Examiner* — Lindsay M Low
*Assistant Examiner* — George C Jin
(74) *Attorney, Agent, or Firm* — Pearne & Gordon LLP

(57) ABSTRACT

A throttle grip apparatus includes a throttle grip, an interlocking member which includes engaged parts to be engaged with engaging parts formed on the throttle grip and is rotatable in conjunction with rotation of the throttle grip, a first biasing unit which biases the interlocking member when the throttle grip rotates in a normal direction, a second biasing unit which biases the interlocking member when the throttle grip rotates in a reverse direction. The engaging parts and the engaged parts are formed respectively on the throttle grip and the interlocking member at regular intervals along a rotation direction of the throttle grip, and the second biasing unit is installed at each of positions between the engaged pans of the interlocking member.

8 Claims, 13 Drawing Sheets

THROTTLE GRIP APPARATUS

CROSS-REFERENCE TO RELATED APPLICATIONS

The present application claims the benefit of priority of Japanese Patent Application Nos. 2016-234402 and 2016-234403, filed on Dec. 1, 2016, the content of which is incorporated herein by reference.

TECHNICAL FIELD

The present invention relates to a throttle grip apparatus for controlling an engine of a vehicle based on a rotating operation of a throttle grip.

BACKGROUND

In recent motorcycles, a throttle position sensor such as a potentiometer detects a rotation angle of a throttle grip and transmits an electric signal representing the detection value to an electric control device and the like mounted on the motorcycle. The electric control device performs calculation based on the detection signal and controls an ignition timing of the engine and opening or closing of an air intake valve or a throttle valve based on the calculation result.

For example, JP-A-2015-81564 discloses a throttle grip apparatus which has a constant-speed maintaining device (a cruise control device) for maintaining a constant running speed and controls an engine of a vehicle according to a rotation angle of a throttle grip if the throttle grip is rotated in a normal direction which is a predetermined direction, and stops (cancels) speed maintaining control of the constant-speed maintaining device if the throttle grip is rotated in the opposite direction to the predetermined direction.

The throttle grip apparatus includes an interlocking member configured to rotate in conjunction with the throttle grip when the throttle grip is rotated in the normal direction which is the predetermined direction, a sliding member configured to slide in conjunction with the throttle grip when the throttle grip is rotated in the opposite direction to the predetermined direction, a first biasing unit configured to bias the interlocking member toward its initial position, and a second biasing unit configured to bias the sliding member toward its initial position, and the sliding member and the second biasing unit are installed inside the interlocking member.

In the throttle grip apparatus, since the throttle grip has only one engaging part to be engaged with the interlocking member, and the second biasing unit also has only one engaging part to be engaged with the interlocking member, when the throttle grip is rotated or when the throttle grip returns to the initial position by the biasing force of the second biasing unit, the rotation becomes unstable so that the operability deteriorates. Further, in the above throttle grip apparatus, since only one second biasing unit is installed inside the interlocking member with respect to the rotation direction of the throttle grip, a spring or the like having a relatively large biasing force should be used as the second biasing unit.

Also, the throttle grip apparatus includes a rotation angle detecting unit having a magnet installed inside the interlocking member and a magnetic sensor configured to detect a change in the magnetic force from the magnet, and detects the rotation angle of the throttle grip by the rotation angle detecting unit. However, since the magnet and the second biasing unit need to be installed inside the interlocking member, the size of the interlocking member increases, and the installation position of the magnetic sensor is limited. Therefore, flexibility in the layout of the inside of the apparatus decreases.

In order to solve those problems, it can be considered to provide a rotary member capable of rotating in conjunction with the interlocking member and detect the rotation angle of the rotary member by the rotation angle detecting unit, thereby detecting the rotation angle of the throttle grip, and install the magnet outside the interlocking member. However, in this case, besides the interlocking member for accommodating the second biasing member, it is necessary to provide a transmission unit for transmitting rotation of the interlocking member to the rotary member to rotate. In this case, since a space for installing the rotary member and a space for the transmission unit are required separately, the size of the whole of the apparatus increases.

SUMMARY

The present invention has been made in view of the above circumstances, and an object of the present invention is to provide a throttle grip apparatus capable of stabilizing rotation of an interlocking member when a throttle grip is rotated and when the throttle grip returns to its initial position by biasing force of a second biasing unit, thereby improving the operability of the throttle grip.

Another object of the present invention is to provide a throttle grip apparatus capable of suppressing an increase in the size of the apparatus even if the apparatus further includes a rotary member configured to operate in conjunction with an interlocking member.

According to a first aspect of the present invention, there is provided a throttle grip apparatus including: a throttle grip which is configured to be rotatable by a driver from an initial position in a normal direction which is a predetermined direction and a reverse direction which is an opposite direction to the predetermined direction; an interlocking member which includes a plurality of engaged parts configured to be engaged with a plurality of engaging parts formed on the throttle grip and is rotatable in conjunction with rotation of the throttle grip in the normal direction and the reverse direction; a case which is configured to rotatably hold the interlocking member; a first biasing unit which is configured to bias the interlocking member toward an initial position when the throttle grip rotates in the normal direction; a second biasing unit which is configured to bias the interlocking member toward the initial position when the throttle grip rotates in the reverse direction; and a rotation angle detecting unit which is configured to detect an rotation angle of the throttle grip by detecting an rotation angle of the interlocking member, wherein the throttle grip apparatus is configured to control an engine of a vehicle according to the rotation angle of the throttle grip detected during rotation of the throttle grip in the normal direction by the rotation angle detecting unit and is configured to activate or stop a predetermined function of the vehicle when the throttle grip rotates in the reverse direction, and wherein the plurality of engaging parts and the plurality of engaged parts are formed respectively on the throttle grip and the interlocking member at regular intervals along a rotation direction of the throttle grip, and the second biasing unit is installed at each of positions between the engaged parts of the interlocking member.

The above throttle grip apparatus may thither include a biasing-force applying unit which is configured to cause a biasing force of the second biasing unit not to be applied to the interlocking member when the throttle grip rotates in the normal direction and cause the biasing force of the second biasing unit to be applied to the interlocking member when the throttle grip rotates in the reverse direction.

In the above throttle grip apparatus, the second biasing unit may be attached to the biasing-force applying unit. When the throttle grip rotates in the normal direction, the biasing-force applying unit may rotate together with the interlocking member such that the biasing force of the second biasing unit is not applied to the interlocking member, and when the throttle grip rotates in the reverse direction, the biasing-force applying unit may stop by contacting a stopper formed on the case such that the biasing force of the second biasing is applied to the interlocking member while allowing rotation of the interlocking member.

In the above throttle grip apparatus, the second biasing unit may include coil springs installed so as to extend in arc shapes at positions between the engaged parts of the interlocking member.

According to a second aspect of the present invention, there is provided a throttle grip apparatus including: a throttle grip which is configured to be rotatable by a driver from an initial position in a normal direction which is a predetermined direction and a reverse direction which is an opposite direction to the predetermined direction; an interlocking member which includes an engaged part configured to be engaged with an engaging part formed on the throttle grip and is rotatable in conjunction with rotation of the throttle grip in the normal direction and the reverse direction; a case which is configured to rotatably hold the interlocking member; a first biasing unit which is configured to bias the interlocking member toward an initial position when the throttle grip rotates in the normal direction; a second biasing unit which is configured to bias the interlocking member toward the initial position when the throttle grip rotates in the reverse direction; a rotary member which is configured to be rotatable in conjunction with the interlocking member; and a rotation angle detecting unit which is configured to detect a rotation angle of the throttle grip by detecting a rotation angle of the rotary member, wherein the throttle grip apparatus is configured to control an engine of a vehicle according to the rotation angle of the throttle grip detected during rotation of the throttle grip in the normal direction by the rotation angle detecting unit and is configured to activate or stop a predetermined function of the vehicle when the throttle grip rotates in the reverse direction, and wherein the interlocking member includes a transmission unit having a gear for transmitting torque of the throttle grip to the rotary member and accommodates therein the second biasing unit.

The above throttle grip apparatus may further include a biasing-force applying unit which is configured to cause a biasing force of the second biasing unit not to be applied to the interlocking member when the throttle grip rotates in the normal direction and cause the biasing force of the second biasing unit to be applied to the interlocking member when the throttle grip rotates in the reverse direction.

In the above throttle grip apparatus, the second biasing unit may be attached to the biasing-force applying unit. When the throttle grip rotates in the normal direction, the biasing-force applying unit may rotate together with the interlocking member such that the biasing force of the second biasing unit is not applied to the interlocking member, and when the throttle grip rotates in the reverse direction, the biasing-force applying unit may stop by contacting a stopper formed on the case such that the biasing force of the second biasing is applied to the interlocking member while allowing rotation of the interlocking member.

In the above throttle grip apparatus, the interlocking member may include a flange having the gear formed over a predetermined range, and the stopper and a contact part of the biasing-force applying unit to come into contact with the stopper are formed at positions corresponding to the flange.

According to the throttle grip apparatus of the first aspect, the plurality of engaging parts and the plurality of engaged parts are respectively formed on the throttle grip and the interlocking member at regular intervals along the rotation direction of the throttle grip, and at each of positions between the engaged parts of the interlocking member, the second biasing unit is installed. Therefore, when the throttle grip is rotated and when the throttle grip returns to the initial position by the biasing force of the second biasing unit, it is possible to stabilize the rotation of the interlocking member, thereby improving the operability of the throttle grip.

The throttle grip apparatus includes the biasing-force applying unit which causes the biasing force of the second biasing unit not to be applied to the interlocking member when the throttle grip rotates in the normal direction and causes the biasing force of the second biasing unit to be applied to the interlocking member when the throttle grip rotates in the reverse direction. Therefore, it is possible to selectively control the first biasing unit and the second biasing unit such that the first or second biasing unit act depending on the direction of rotation of the throttle grip.

Also, the second biasing unit is attached to the biasing-force applying unit, and when the throttle grip rotates in the normal direction, the biasing-force applying unit rotates together with the interlocking member such that the biasing force of the second biasing unit is not applied to the interlocking member, and when the throttle grip rotates in the reverse direction, the biasing-force applying unit stops by contacting a stopper formed on the case such that the biasing force of the second biasing is applied to the interlocking member while allowing rotation of the interlocking member. Therefore, it is possible to appropriately and surely apply the biasing force of the first biasing unit or the second biasing unit to the interlocking member according to the rotation direction of the throttle grip.

Also, the second biasing unit includes coil springs installed so as to extend in arc shapes at positions between the engaged parts of the interlocking member. Therefore, when the throttle grip returns to the initial position by the biasing force of the second biasing unit, it is possible to stabilize rotation of the interlocking member, thereby further improving the operability of the throttle grip.

According to the throttle grip apparatus of the second aspect, the interlocking member includes the transmission unit having the gear for transmitting torque of the throttle grip to the rotary member and accommodates therein the second biasing unit. Therefore, even if the rotary member for operating in conjunction with the interlocking member is provided in the apparatus, it is possible to suppress an increase in the size of the apparatus.

The throttle grip apparatus includes the biasing-force applying unit which causes the biasing force of the second biasing unit not to be applied to the interlocking member when the throttle grip rotates in the normal direction and causes the biasing force of the second biasing unit to be applied to the interlocking member when the throttle grip rotates in the reverse direction. Therefore, it is possible to selectively control the first biasing unit and the second biasing unit such that the first or second biasing unit act depending on the direction of rotation of the throttle grip.

Also, the second biasing unit is attached to the biasing-force applying unit, and when the throttle grip rotates in the normal direction, the biasing-force applying unit rotates together with the interlocking member such that the biasing force of the second biasing unit is not applied to the interlocking member, and when the throttle grip rotates in the reverse direction, the biasing-force applying unit stops by contacting a stopper formed on the case such that the biasing force of the second biasing is applied to the interlocking member while allowing rotation of the interlocking member. Therefore, it is possible to appropriately and surely apply the biasing force of the first biasing unit or the second biasing unit to the interlocking member according to the rotation direction of the throttle grip.

Also, the interlocking member includes the flange having the gear formed over the predetermined range, and the stopper and the contact part of the biasing-force applying unit to come into contact with the stopper are formed at positions corresponding to the flange. Therefore, it is possible to form the stopper and the contact part within the diameter of the interlocking member, and thus it is possible to reduce the size of the throttle grip apparatus in the radial direction.

BRIEF DESCRIPTION OF THE DRAWINGS

The above and other aspects of the present invention will become more apparent and more readily appreciated from the following description of embodiments of the present invention taken in conjunction with the attached drawings, in which.

DETAILED DESCRIPTION

Hereinafter, an embodiment of the present invention will be described in detail with reference to the accompanying drawings.

Figure 1:
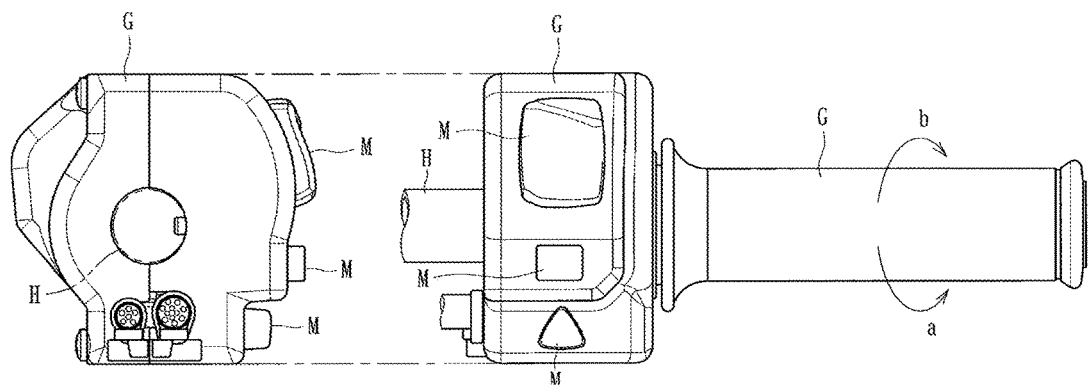
FIG. 1 is a side view and a front view illustrating a throttle grip and a switch case of a vehicle to which a throttle grip apparatus according to an embodiment of the present invention is applied.

A throttle grip apparatus according to the present embodiment detects a rotation angle of a throttle grip G attached to a handlebar H of a motorcycle, as shown in FIG. 1 and transmits the detection signal to an electric control device such as an ECU mounted on the motorcycle. As shown in FIGS. 2 to 8, the throttle grip apparatus includes the throttle grip G, a case 1, an interlocking member 2, a biasing-force applying unit 3, a first biasing unit 4, a second biasing unit 5, a rotary member 6, and a magnetic sensor 7 (a rotation angle detecting means).

The case 1 is installed inside a switch case S attached to a tip end side (on a base end side of the throttle grip G) of the handlebar H of the motorcycle (a vehicle) (see FIG. 1). The case 1 accommodates various components to constitute the throttle grip apparatus and rotatably holds the interlocking member 2, the biasing-force applying unit 3, the rotary member 6, and the like. In FIG. 1, reference symbols "M" represent switch knobs formed on the switch case S, and a driver can operate a desired switch knob M to activate a desired electric component mounted on the motorcycle. A reference symbol "9" represents a lid member for closing the opening side of the case 1.

The throttle grip G is installed to extend from the switch case S such that a driver can grab the throttle grip and rotate it and can be rotated on a shaft in a normal direction "a" which is a predetermined direction, and in a reverse direction "b" which is the opposite direction to the predetermined distance, from its initial position. On the base end side of the throttle grip G, engaging parts Ga (see FIG. 2 and FIG. 10) including a pair of protruding parts are formed, and these engaging parts Ga are engaged with engaged parts 2a of the interlocking member 2 (see FIG. 2), so that the throttle grip G and the interlocking member 2 are joined.

Figure 10:
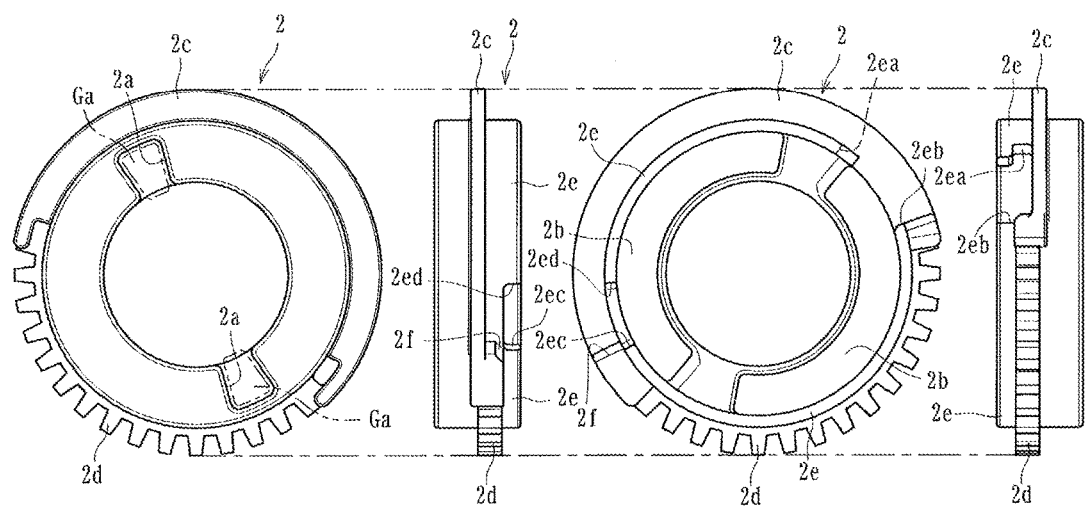
FIG. 10 is four views illustrating an interlocking member of the throttle grip apparatus.

The interlocking member 2 has the engaged parts 2a which can be engaged with the engaging parts Ga formed on the throttle grip G and can rotate in conjunction with rotation of the throttle grip G in the normal direction "a" and the reverse direction "b". Specifically, as shown in FIG. 10, the interlocking member 2 according to the present embodiment includes an annular member having the pair of engaged parts 2a, a pair of accommodating parts 2b, a flange 2c, and a gear 2d.

The engaged parts 2a are formed in a recess shape at positions corresponding to the engaging parts Ga of the throttle grip G, and the engaging parts Ga are fit in the engaged parts 2a and are engaged with the engaged parts, whereby the base end side of the throttle grip G is connected to the interlocking member 2. Therefore, the interlocking member 2 also can rotate with rotation of the throttle grip G The engaged parts 2a are formed on a surface of the interlocking member 2 (one surface which is set to face the outside when the interlocking member is assembled with the case 1), and the accommodating parts 2b are formed on the other surface of the interlocking member. On the other surface of the interlocking member 2, a pair of protrusions 2e is formed in an arc shape.

The accommodating parts 2b are formed as arc-shaped grooves at positions between the pair of engaged parts 2a and accommodate therein compression coil springs to constitute the second biasing units 5, respectively. The flange 2c is formed over the whole of the circumferential direction of the interlocking member 2 so as to protrude outward in the radial direction and has the gear 2d over a predetermined range. The gear 2d can be engaged with a gear formed on the outer circumference of the rotary member 6 such that the rotary member 6 can rotate with rotation of the interlocking member 2.

Figure 2:
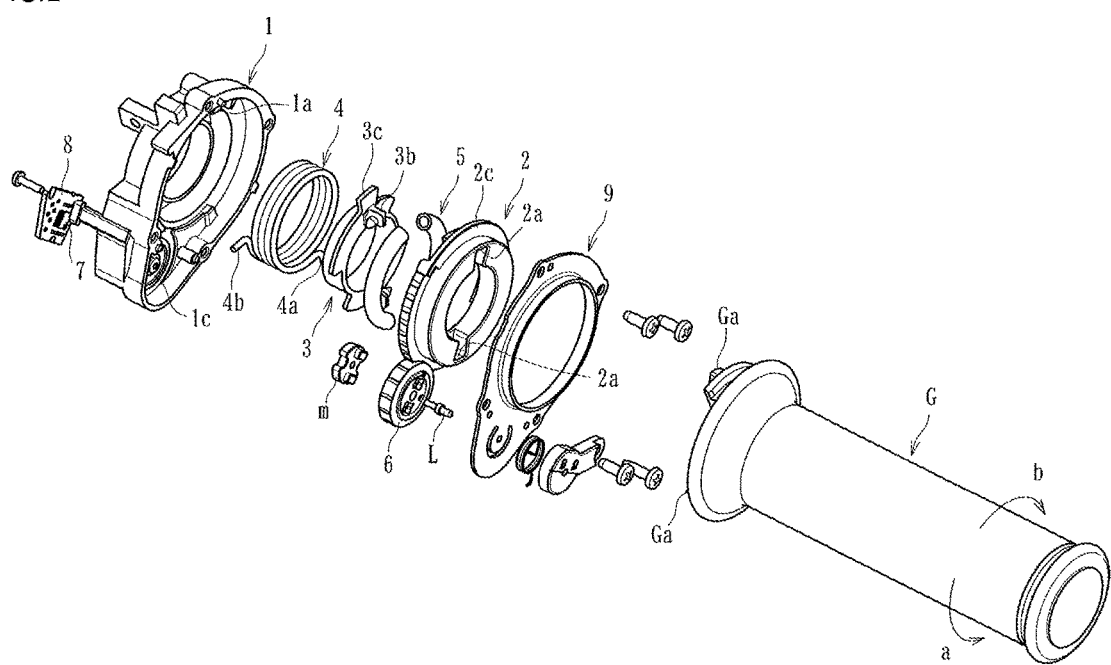
FIG. 2 is an exploded perspective view illustrating the throttle grip apparatus.
Figure 3:
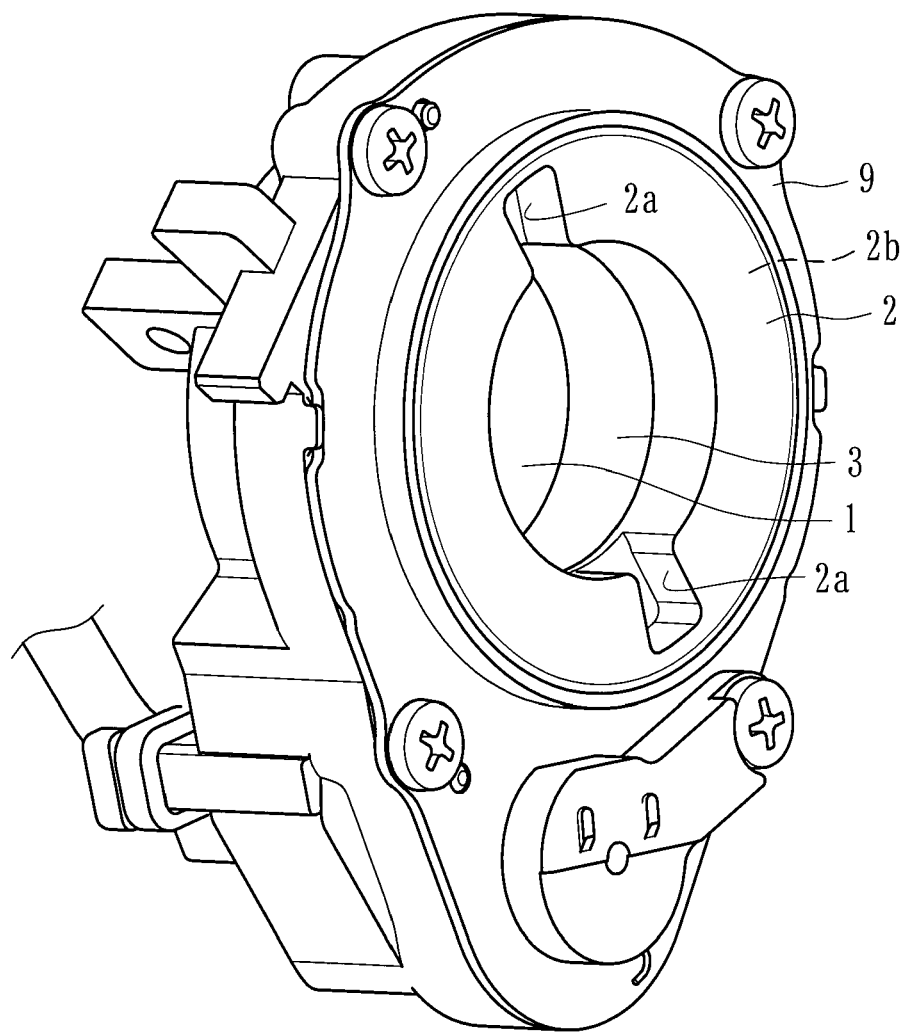
FIG. 3 is a perspective view illustrating the throttle grip apparatus.
Figure 4:
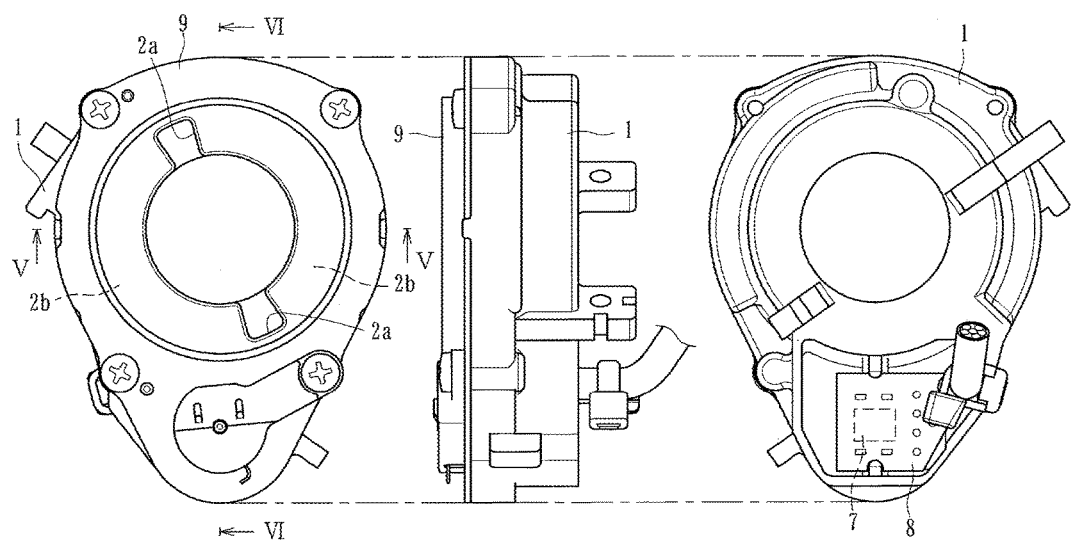
FIG. 4 is three views illustrating the throttle grip apparatus.
Figure 5:
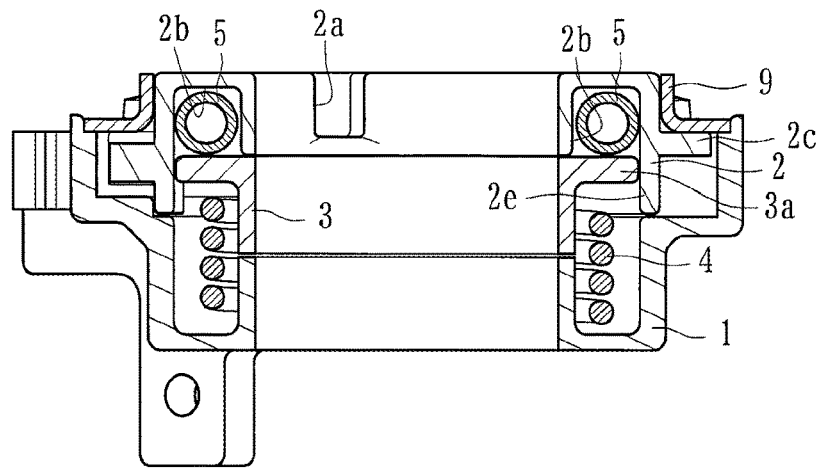
FIG. 5 is a cross-sectional view taken along a line V-V of FIG. 4.
Figure 6:
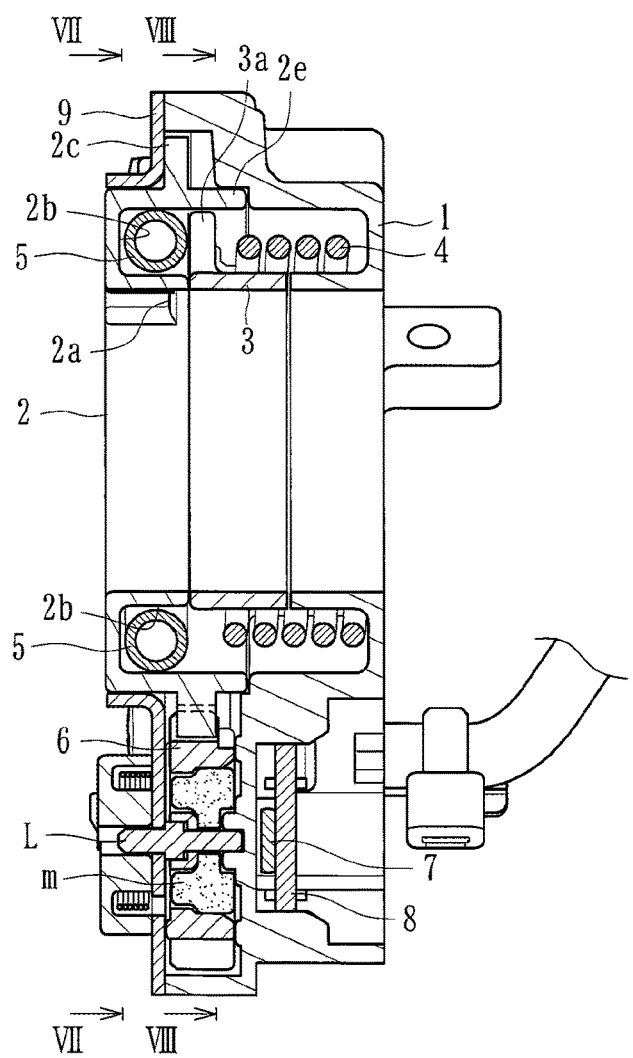
FIG. 6 is a cross-sectional view taken along a line VI-VI of FIG. 4.
Figure 9:
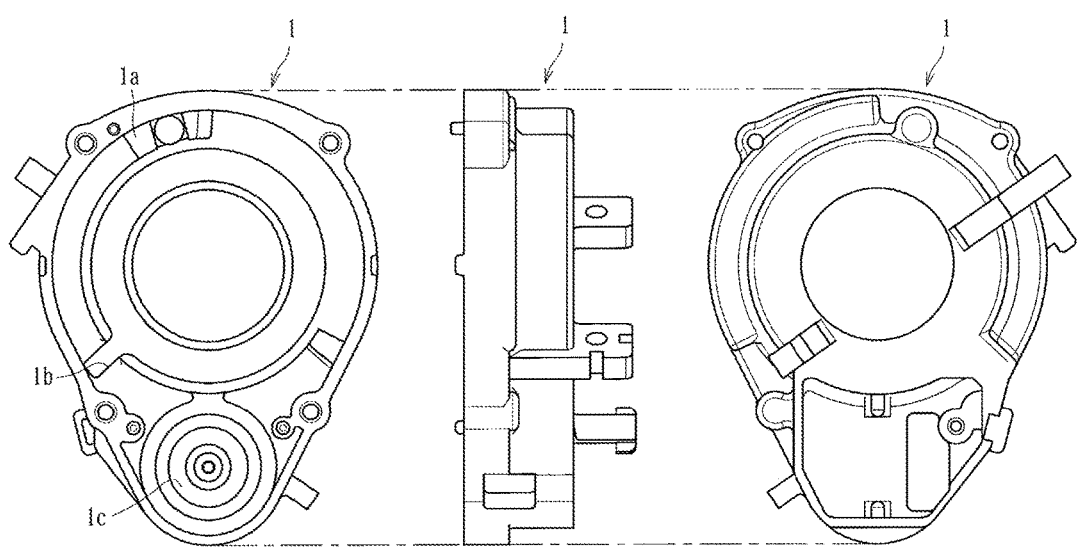
FIG. 9 is three views illustrating the case of the throttle grip apparatus.

The rotary member 6 can rotate in conjunction with the interlocking member 2 as described above and is accommodated in an accommodating recess part 1c (see FIG. 9) formed at a predetermined position of the case 1 and is rotatable on a shaft L (see FIGS. 2 and 6). Therefore, when the interlocking member 2 rotates, the rotary member 6 rotates by a rotation angle according to the rotation angle of the interlocking member 2. On the rotary member 6, a magnet m is attached, and according to rotation of the rotary member 6, magnetic force which is generated from the magnet m varies.

The magnetic sensor 7 (the rotation angle detecting unit) includes a sensor installed at a position on an extension line of the shaft L of the rotary member 6 as shown in FIG. 6 and can detect the rotation angle of the throttle grip G by detecting a change in magnetic force generated from the magnet m attached to the rotary member 6. Specifically, the magnetic sensor 7 can obtain output voltage according to variation in the magnetic field of the magnet m (variation in the density of magnetic flux) and is configured with, for example, a Hall element which is a magnetic sensor using the Hall effect (specifically, a linear Hall IC capable of obtaining output voltage proportional to the magnetic field (the density of magnetic flux) of the magnet m). The magnetic sensor 7 according to the present embodiment is formed on a printed board 8 having a predetermined electric circuit printed thereon.

Therefore, as the throttle grip G rotates in the normal direction "a", the interlocking member 2 rotates in the same direction. Then, the rotary member 6 also rotates in conjunction with the interlocking member, and the magnet m attached to the rotary member 6 also rotates in the same direction by the same angle. According to the rotation angle, the magnetic force varies. Therefore, the magnetic sensor can obtain output voltage according to the corresponding rotation angle and detect the rotation angle of the interlocking member 2 (i.e. the rotation angle of the throttle grip G) based on the output voltage. An electric signal representing the rotation angle of the throttle grip detected in the above-described manner is transmitted to an ECU (an engine control unit) mounted on the motorcycle, and the vehicle engine can be controlled according to the rotation angle of the throttle grip G.

Meanwhile, when the throttle grip G rotates in the reverse direction "b", the interlocking member rotates in the same direction. Then, the rotary member 6 also rotates in conjunction with the interlocking member, and the magnet m attached to the rotary member 6 also rotates in the same direction by the same angle. According to the rotation angle, the magnetic force varies. Therefore, the magnetic sensor can obtain output voltage according to the corresponding rotation angle and detect the rotation of the throttle grip G in the reverse direction "b".

When rotation of the throttle grip G in the reverse direction "b" is detected as described above, a predetermined function of the motorcycle can be activated or stopped. In the present embodiment, the throttle grip apparatus is applied to the motorcycle having a constant-speed maintaining device (a cruise control device) for maintaining a constant running speed, and when the throttle grip G is rotated in the reverse direction (in the opposite direction "b" to the normal direction "a" for fully opening the throttle, from the initial position), the constant-speed maintaining control can be stopped (cancelled).

That is, the interlocking member 2 according to the present embodiment includes a transmission unit having the gear 2d for transmitting the torque of the throttle grip G to the rotary member 6 and accommodates therein the second biasing unit 5 (in the present embodiment, inside the accommodating parts 2b). Therefore, the interlocking member 2 has the function of transmitting the torque of the throttle grip G and the function of accommodating the second biasing unit 5.

The interlocking member 2 according to the present embodiment has the flange 2c having the gear 2d formed over the predetermined range. As shown in FIGS. 12A to 14C, a stopper 1a, and a contact part 3c of the biasing-force applying unit 3 to come into contact with the stopper 1a are formed at positions corresponding to the flange 2c. Therefore, it is possible to provide the stopper 1a and the contact pan 3c within the diameter of the flange 2c of the interlocking member 2, resulting in a decrease in size.

The first biasing unit 4 includes a torsion coil spring and is configured to bias the interlocking member 2 toward the initial position when the throttle grip G rotates in the normal direction "a". In other words, when the throttle grip G is rotated in the normal direction "a", the interlocking member 2 rotates against the biasing force of the first biasing unit 4. Therefore, the biasing force is transmitted to the throttle grip G, and acts as force returning the throttle grip G to the initial position.

The second biasing unit 5 includes a pair of coil springs and is configured to bias the interlocking member 2 toward the initial position when the throttle grip G rotates in the reverse direction "b". In other words, when the throttle grip G is rotated in the reverse direction "b", the interlocking member 2 rotates against the biasing force of the second biasing unit 5. Therefore, the biasing force is transmitted to the throttle grip G, and acts as force returning the throttle grip G to the initial position.

Figure 11:
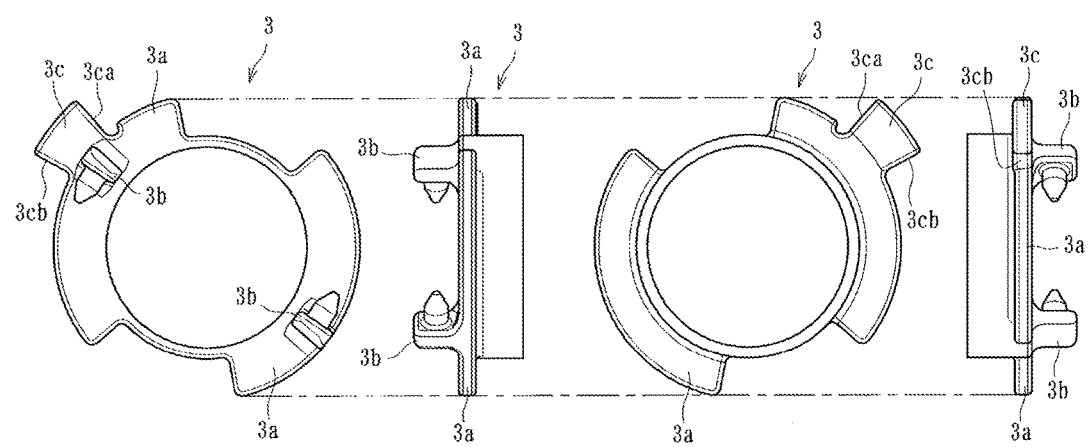
FIG. 11 is four views illustrating a biasing-force applying unit of the throttle grip apparatus.

The second biasing mean 5 is attached to the biasing-force applying unit 3, and when the throttle grip G rotates in the normal direction, the biasing-force applying unit 3 does not apply the biasing force of the second biasing unit 5 to the interlocking member 2 (at this time, only the biasing force of the first biasing unit 4 is applied to the interlocking member), whereas when the throttle grip G rotates in the reverse direction, the biasing-force applying unit can apply the biasing force of the second biasing unit 5 to the interlocking member 2. Specifically, as shown in FIG. 11, the biasing-force applying unit 3 includes an annular member having the pair of protrusions 3a, a pair of spring holders 3b for holding ends 5a of the second biasing unit 5 positioned on one side, and the contact part 3c.

Figure 12A:
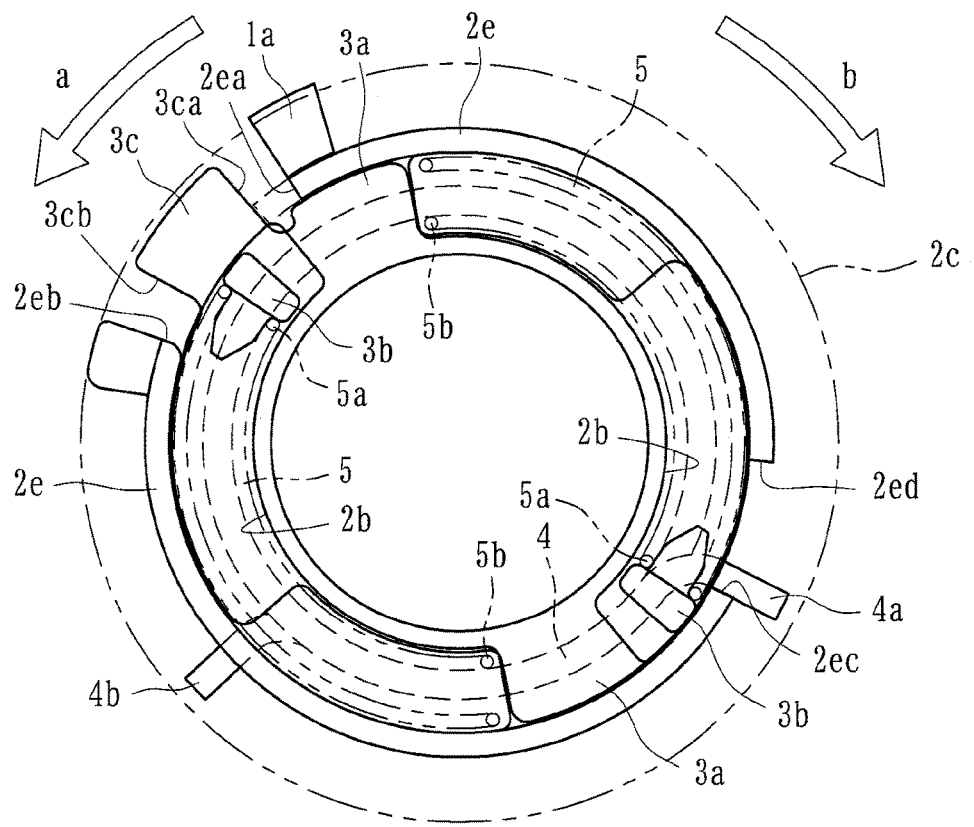
FIGS. 12A to 12C are views for explaining an operation of the biasing-force applying unit of the throttle grip apparatus and illustrating a state where the biasing-force applying unit and the interlocking member are at their initial positions.
Figure 12B:
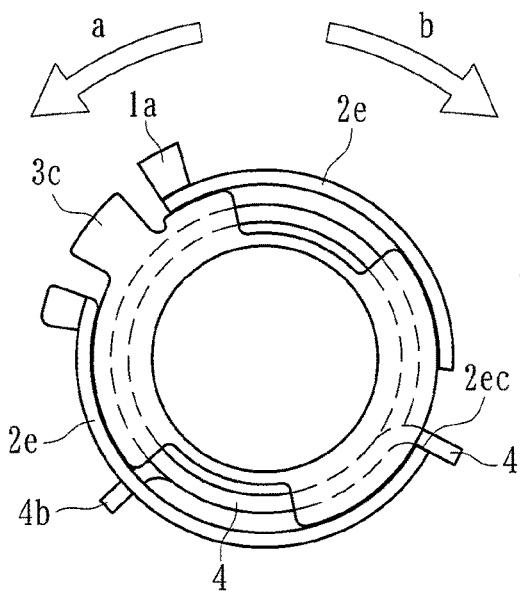
Figure 12C:
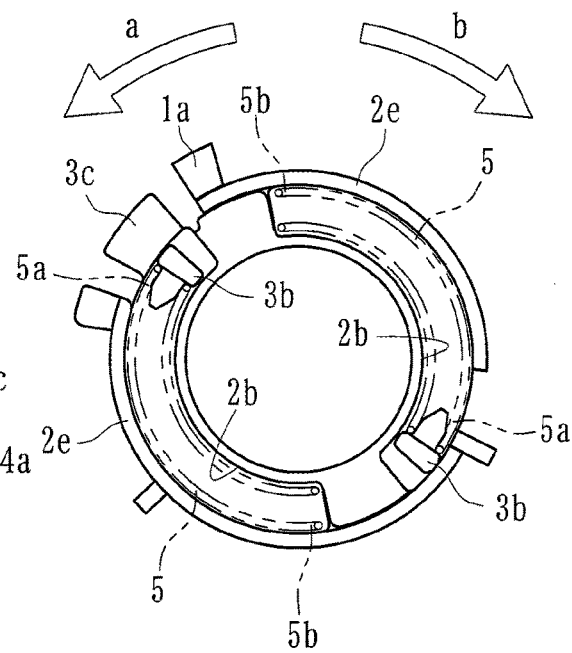
Figure 13A:
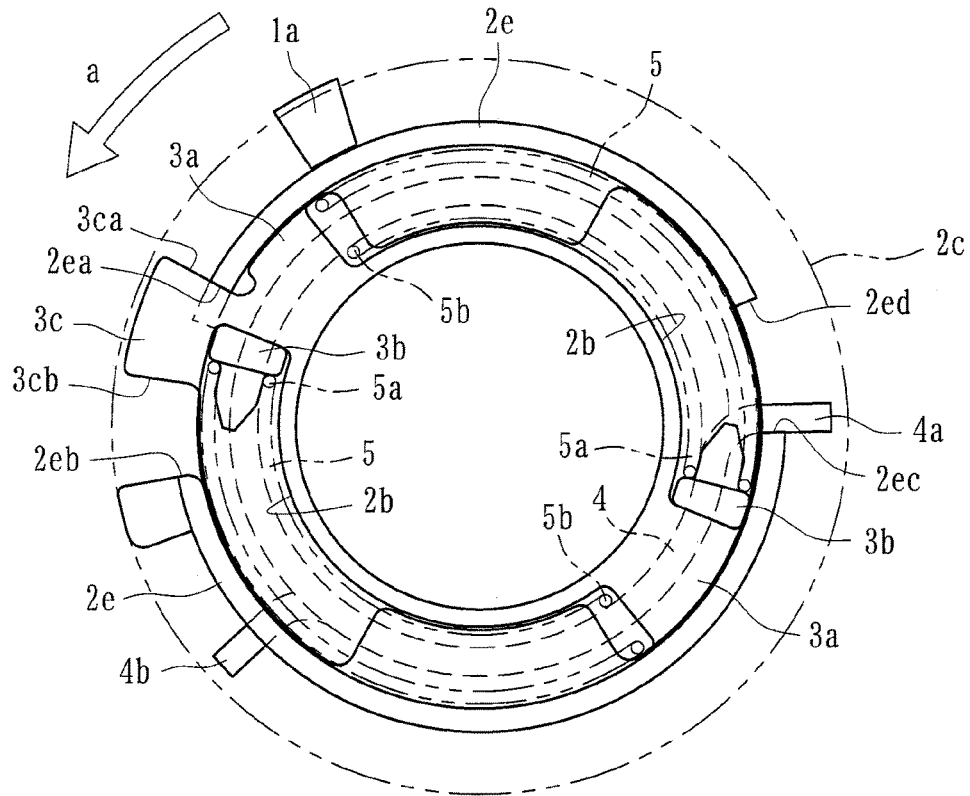
FIGS. 13A to 13C are views for explaining the operation of the biasing-force applying unit of the throttle grip apparatus and illustrating the states of the biasing-force applying unit and the interlocking member when the throttle grip is rotated in a normal direction.
Figure 13B:
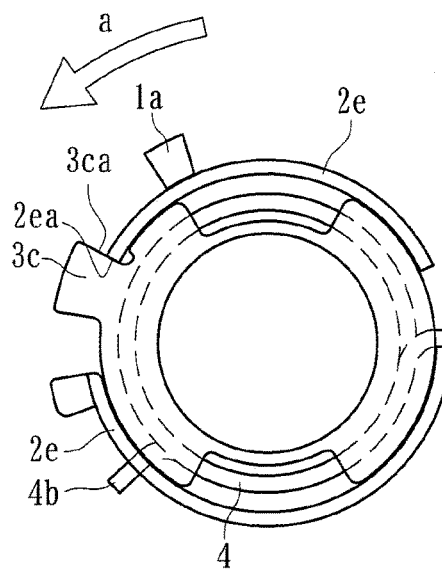
Figure 13C:
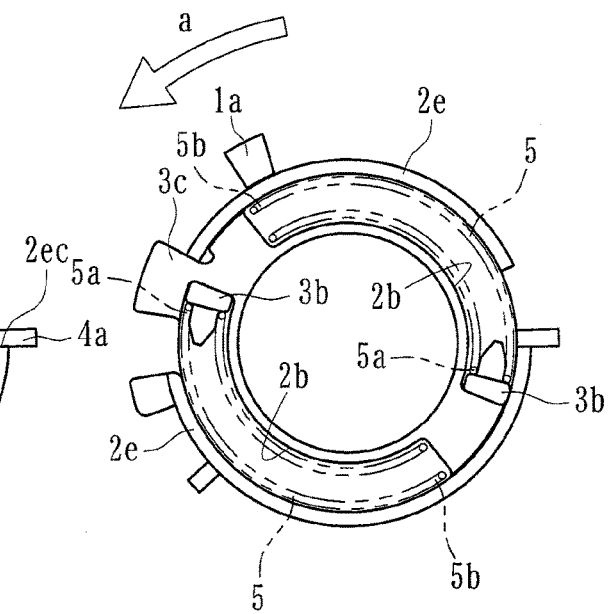
Figure 14A:
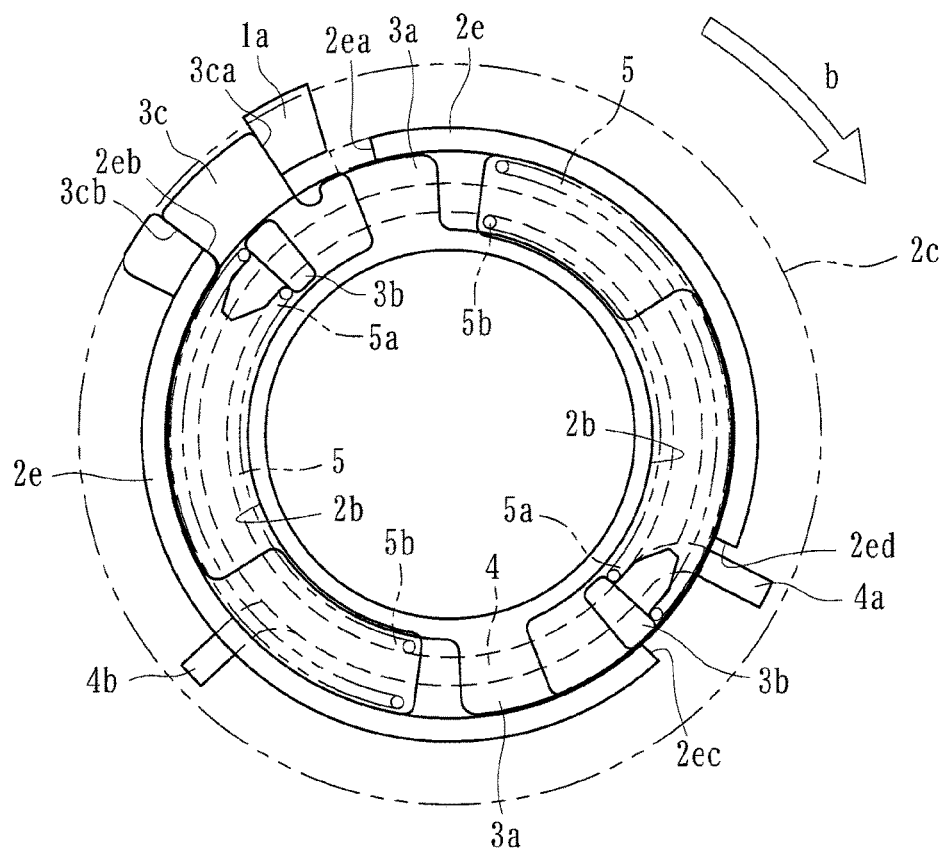
FIGS. 14A to 14C are views for explaining the operation of the biasing-force applying unit of the throttle grip apparatus and illustrating the states of the biasing-force applying unit and the interlocking member when the throttle grip is rotated in a reverse direction.
Figure 14B:
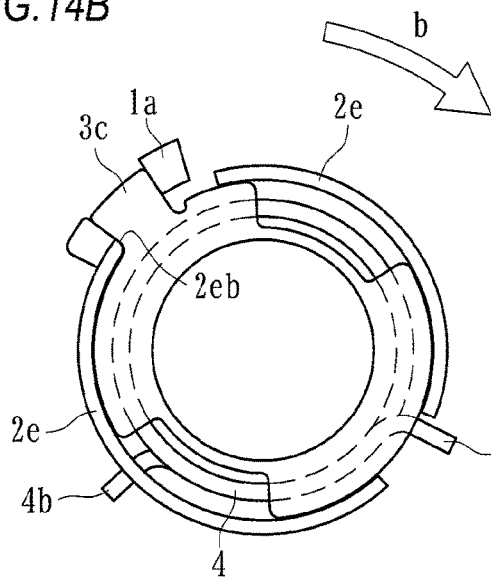
Figure 14C:
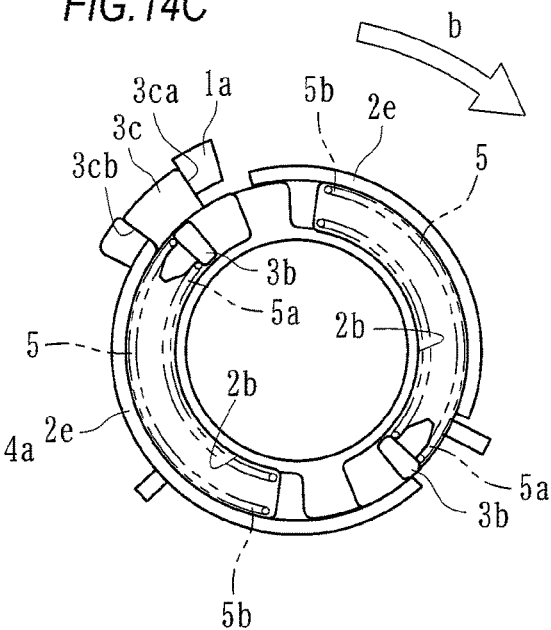

One of the pair of protrusions 3a has the contact part 3c protruding outward in the radial direction from the protrusion 3a. Therefore, in a state where the biasing-force applying unit 3 is assembled with the interlocking member 2, as shown in FIGS. 12A to 12C, the contact part 3c is positioned between the pair of protrusions 2e (between an end part 2ea of one protrusion 2e and an end part 2eb of the other protrusion 2e), and when the interlocking member 2 rotates in the normal direction "a", as shown in FIGS. 13A to 13C, the end part 2ea of the protrusion 2e presses one end surface 3ce of the contact part 3c, whereby the biasing-force applying unit 3 rotates with the interlocking member 2. Meanwhile, when the interlocking member 2 rotates in the reverse direction "b", as shown in FIGS. 14A to 14C, the end part 2eb of the other protrusion 2e rotates until it comes into contact with the other end surface 3cb of the contact part 3c. Until the end part 2eb comes into contact with the end surface 3cb, since it does not press the one end surface 3ca, rotation of the interlocking member 2 is allowed and the biasing-force applying unit 3 is not rotated.

Figure 7:
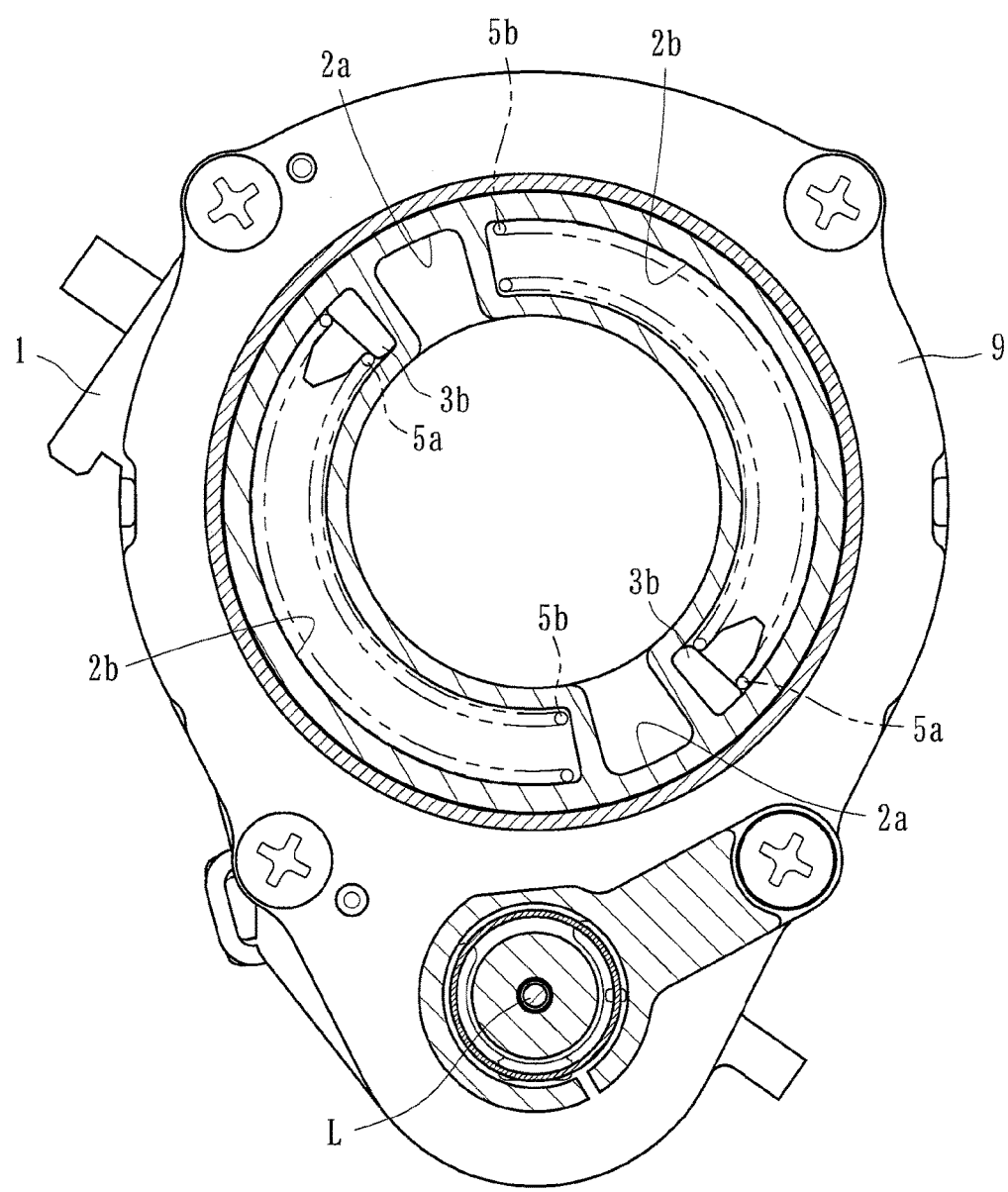
FIG. 7 is a cross-sectional view taken along a line VII-VII of FIG. 6.
Figure 8:
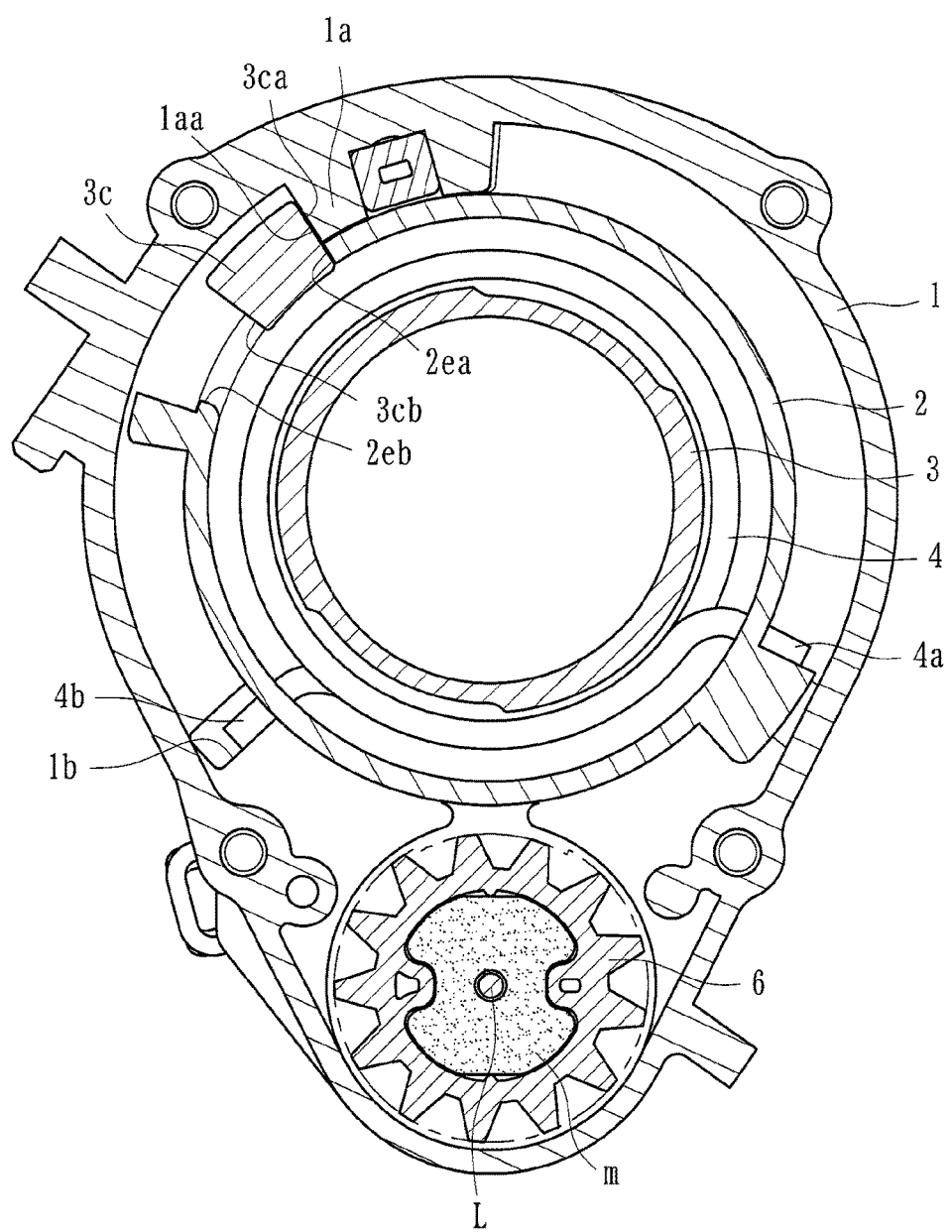
FIG. 8 is a cross-sectional view taken along a line VIII-VIII of FIG. 6.

In a state where the biasing-force applying unit 3 is attached to the interlocking member 2, since the spring holders 3b are positioned inside the accommodating parts 2b of the interlocking member 2, they can hold the ends 5a of the second biasing unit 5 accommodated in the accommodating parts 2b, as shown in FIG. 7. Also, the second biasing unit 5 is assembled such that the ends 5a are supported by the spring holders 3b and the other ends 5b come into contact with the edge wall surfaces of the accommodating parts 2b. Therefore, when the interlocking member 2 and the biasing-force applying unit 3 rotate together (see FIGS. 13A to 13C), the biasing force of the second biasing unit 5 does not act, whereas when the interlocking member 2 rotates but the biasing-force applying unit 3 is in a stop state (see FIGS. 14A to 14C), the second biasing unit 5 is compressed, whereby the biasing force is applied to the interlocking member 2.

Further, the contact part 3c includes a part integrally formed so as to protrude outward in the radial direction of the biasing-force applying unit 3 and can come into contact with the stopper 1a as shown in FIGS. 14A to 14C when the interlocking member 2 rotates in the reverse direction "b". Therefore, even when the interlocking member 2 rotates in the reverse direction "b" and receives a reaction force attributable to the biasing force of the second biasing unit 5, the stop state of the biasing-force applying unit 3 is maintained.

In the meantime, one end 4a of the first biasing unit 4 is engaged with an engaging part 2f (see FIG. 10) formed on the interlocking member 2, and the other end 4b thereof is engaged with an engaging part 1b (see FIG. 8) formed on the case 1. Therefore, when the interlocking member 2 rotates in the normal direction "a", and the biasing-force applying unit 3 rotates together, as shown in FIGS. 13A to 13C, the end 4a is pressed against an end part 2ec of a protrusion 2e, whereby the biasing force is applied to the interlocking member 2 and the biasing-force applying unit 3. Meanwhile, when the interlocking member 2 rotates in the reverse direction "b", as shown in FIGS. 14A to 14C, the end 4a of the first biasing unit 4 is held at a position between the protrusions 2e (between an end part 2ed of one protrusion 2e and the end part 2ec of the other protrusion 2e) and is not pressed. Therefore, the biasing force of the first biasing unit 4 is not applied.

As described above, the biasing-force applying unit 3 according to the present embodiment has the second biasing unit 5 attached thereon. Further, when the throttle grip G rotates in the normal direction "a", the biasing-force applying unit rotates together with the interlocking member 2, and does not apply the biasing force of the second biasing unit 5 to the interlocking member 2 (the biasing force of the first biasing unit 4 is applied), whereas when the throttle grip G rotates in the reverse direction "b", rotation of the interlocking member 2 is allowed, and when the stopper 1a and the contact part 3c come into contact with each other, whereby the interlocking member is stopped, the biasing-force applying unit can apply the biasing force of the second biasing unit 5 to the interlocking member 2 (the biasing force of the first biasing unit 4 is not applied). Therefore, it is possible to appropriately and surely apply the biasing force of the first biasing unit 4 or the second biasing unit 5 to the interlocking member 2, depending on the rotation direction of the throttle grip G.

In the present embodiment, on the throttle grip G and the interlocking member 2, the plurality of engaging pans Ga and the plurality of engaged parts 2a (in the present embodiment, two engaging parts and two engaged parts) are formed at regular intervals along the rotation direction of the throttle grip G, respectively, and at positions on the interlocking member 2 between the engaged parts 2a, the second biasing units 5 are installed, respectively. Therefore, when the throttle grip G is rotated and when the throttle grip G returns to the initial position by the biasing force of the second biasing units 5, it is possible to stabilize rotation of the interlocking member 2, thereby capable of improving the operability of the throttle grip G.

In the present embodiment, on the throttle grip G and the interlocking member 2, two engaging parts Ga and two engaged parts 2a are formed at regular intervals along the rotation direction of the throttle grip G, respectively. However, since it is needed only to form a plurality of engaging parts and a plurality of engaged parts at regular intervals along the rotation direction of the throttle grip G, for example, three or more engaging parts and three or more engaging parts may be formed, and at positions between the engaged parts 2a, second biasing units 5 may be installed, respectively.

Also, the throttle grip apparatus includes the biasing-force applying unit 3, which does not apply the biasing force of the second biasing unit 5 to the interlocking member 2 when the throttle grip G rotates in the normal direction, but can apply the biasing force of the second biasing unit 5 to the interlocking member 2 when the throttle grip G rotates in the reverse direction. Therefore, it is possible to selectively control the first biasing unit 4 and the second biasing unit 5 such that the first or second biasing unit act depending on the direction of rotation of the throttle grip G. Therefore, a driver can rotate the throttle grip G more smoothly, and it is possible to further improve the operability.

Further, the second biasing unit 5 according to the present embodiment includes coil springs installed so as to extend in arc shapes at positions between the engaged parts 2a of the interlocking member 2. Therefore, when the throttle grip G returns to the initial position by the biasing force of the second biasing unit 5, it is possible to stabilize rotation of the interlocking member 2, thereby further improving the operability of the throttle grip G. Meanwhile, since the plurality of second biasing units 5 (in the present embodiment, two) is installed, it is possible to reduce the biasing force of each second biasing unit, and a worker can easily accommodate the second biasing units 5 in the accommodating parts 2b when assembling the apparatus.

Further, according to the present embodiment, the interlocking member 2 includes the transmission unit having the gear 2d for transmitting torque of the throttle grip G to the rotary member 6 and accommodate therein the second biasing unit 5. Therefore, even if the rotary member 6 for operating in conjunction with the interlocking member 2 is provided in the apparatus, it is possible to suppress an increase in the size of the apparatus. Also, when the rotary member 6 rotates in conjunction with the interlocking member 2, the magnetic sensor 7 (the rotation angle detecting means) detects the rotation of the rotary member, thereby detecting the rotation angle of the throttle grip G Therefore, it is unnecessary to form the magnet m or the like on the interlocking member 2, and it is possible to sufficiently secure spaces for installing the second biasing unit 5.

Moreover, according to the present embodiment, the interlocking member 2 has the flange 2c having the gear 2d formed over the predetermined range, and the stopper 1a, and the contact part 3c of the biasing-force applying unit 3 to come into contact with the stopper 1a are formed at positions corresponding to the flange 2c. Therefore, it is possible to form the stopper 1a and the contact part 3c within the diameter of the interlocking member 2, and thus it is possible to reduce the size of the throttle grip apparatus in the radial direction.

Although the present embodiment has been described above, the present invention is not limited thereto. For example, the first biasing unit 4 may be configured with a biasing means other than torsion coil springs (a different biasing means for biasing the interlocking member 2 toward the initial position when the throttle grip G rotates in the normal direction), and the second biasing unit 5 may be configured with biasing means other than coil springs (different biasing means for biasing the interlocking member 2 toward the initial position when the throttle grip G rotates in the reverse direction). Also, in place of the magnetic sensor 7, any other sensor capable of detecting the angle of rotation of the throttle grip G (such as a sensor which does not use magnetism) may be used.

Further, in the present embodiment, when the throttle grip G rotates in the reverse direction, constant-speed maintaining control of the constant-speed maintaining device (an auto cruise device) is stopped (cancelled). However, it is needed only to activate or stop a predetermined function of the vehicle when rotation of the throttle grip G in the reverse direction is detected. For example, according to rotation of the throttle grip G in the reverse direction, start of authentication in an immobilizer system or a smart engine, an operation of a starter to start the engine, an operation of turning on emergency-lights (such as hazard lights), or the like may be activated. Also, in the present embodiment, the inventive concept of the present invention is applied to the motorcycle. However, the inventive concept of the present invention may be applied to other vehicles having handlebars H (such as an ATV and a snowmobile).

If a throttle grip apparatus has a plurality of engaging parts and a plurality of engaged parts formed on a throttle grip and an interlocking member at regular intervals along the rotation direction of the throttle grip, respectively, and has a second biasing unit installed at each of positions between the engaged parts of the interlocking member, even though the apparatus has a different shape or further has any other function, the present invention can be applied to the apparatus.

If a throttle grip apparatus has an interlocking member including a transmission unit having a gear for transmitting torque of a throttle grip to a rotary member and has second biasing unit accommodated in the interlocking member, even though the apparatus has a different shape or further has any other function, the present invention can be applied to the corresponding apparatus.

What is claimed is:

1. A throttle grip apparatus comprising:
   a throttle grip which is configured to be rotatable by a driver from an initial position in a normal direction which is a predetermined direction and a reverse direction which is an opposite direction to the predetermined direction;
   an interlocking member which includes a plurality of engaged parts configured to be engaged with a plurality of engaging parts formed on the throttle grip and is rotatable in conjunction with rotation of the throttle grip in the normal direction and the reverse direction;
   a case which is configured to rotatably hold the interlocking member;
   a first biasing unit which is configured to bias the interlocking member toward an initial position when the throttle grip rotates in the normal direction;
   a second biasing unit which is configured to bias the interlocking member toward the initial position when the throttle grip rotates in the reverse direction; and
   a rotation angle detecting unit which is configured to detect an rotation angle of the throttle grip by detecting an rotation angle of the interlocking member,
   wherein the throttle grip apparatus is configured to control an engine of a vehicle according to the rotation angle of the throttle grip detected during rotation of the throttle grip in the normal direction by the rotation angle detecting unit and is configured to activate or stop a predetermined function of the vehicle when the throttle grip rotates in the reverse direction, and
   wherein the plurality of engaging parts and the plurality of engaged parts are formed respectively on the throttle grip and the interlocking member at regular intervals along a rotation direction of the throttle grip, and the second biasing unit is installed at each of positions between the engaged parts of the interlocking member.

2. The throttle grip apparatus according to claim 1, further comprising:
   a biasing-force applying unit which is configured to cause a biasing force of the second biasing unit not to be applied to the interlocking member when the throttle grip rotates in the normal direction and cause the biasing force of the second biasing unit to be applied to the interlocking member when the throttle grip rotates in the reverse direction.

3. The throttle grip apparatus according to claim 2,
   wherein the second biasing unit is attached to the biasing-force applying unit, and
   wherein when the throttle grip rotates in the normal direction, the biasing-force applying unit rotates together with the interlocking member such that the biasing force of the second biasing unit is not applied to the interlocking member, and when the throttle grip rotates in the reverse direction, the biasing-force applying unit stops by contacting a stopper formed on the case such that the biasing force of the second biasing is applied to the interlocking member while allowing rotation of the interlocking member.

4. The throttle grip apparatus according to claim 1,
   wherein the second biasing unit includes coil springs installed so as to extend in arc shapes at positions between the engaged parts of the interlocking member.

5. A throttle grip apparatus comprising:
   a throttle grip which is configured to be rotatable by a driver from an initial position in a normal direction which is a predetermined direction and a reverse direction which is an opposite direction to the predetermined direction;
   an interlocking member which includes an engaged part configured to be engaged with an engaging part formed on the throttle grip and is rotatable in conjunction with rotation of the throttle grip in the normal direction and the reverse direction;
   a case which is configured to rotatably hold the interlocking member;

a first biasing unit which is configured to bias the interlocking member toward an initial position when the throttle grip rotates in the normal direction;

a second biasing unit which is configured to bias the interlocking member toward the initial position when the throttle grip rotates in the reverse direction;

a rotary member which is configured to be rotatable in conjunction with the interlocking member; and a rotation angle detecting unit which is configured to detect a rotation angle of the throttle grip by detecting a rotation angle of the rotary member, wherein the throttle grip apparatus is configured to control an engine of a vehicle according to the rotation angle of the throttle grip detected during rotation of the throttle grip in the normal direction by the rotation angle detecting unit and is configured to activate or stop a predetermined function of the vehicle when the throttle grip rotates in the reverse direction, and wherein the interlocking member includes a transmission unit having a gear for transmitting torque of the throttle grip to the rotary member and accommodates therein the second biasing unit.

6. The throttle grip apparatus according to claim 5, further comprising:

a biasing-force applying unit which is configured to cause a biasing force of the second biasing unit not to be applied to the interlocking member when the throttle grip rotates in the normal direction and cause the biasing force of the second biasing unit to be applied to the interlocking member when the throttle grip rotates in the reverse direction.

7. The throttle grip apparatus according to claim 6, wherein the second biasing unit is attached to the biasing-force applying unit, and wherein when the throttle grip rotates in the normal direction, the biasing-force applying unit rotates together with the interlocking member such that the biasing force of the second biasing unit is not applied to the interlocking member, and when the throttle grip rotates in the reverse direction, the biasing-force applying unit stops by contacting a stopper formed on the case such that the biasing force of the second biasing is applied to the interlocking member while allowing rotation of the interlocking member.

8. The throttle grip apparatus according to claim 7, wherein the interlocking member includes a flange having the gear formed over a predetermined range, and the stopper and a contact part of the biasing-force applying unit to come into contact with the stopper are formed at positions corresponding to the flange.

* * * * *

UNITED STATES PATENT AND TRADEMARK OFFICE
CERTIFICATE OF CORRECTION

PATENT NO. : 10,377,441 B2  
APPLICATION NO. : 15/827643  
DATED : August 13, 2019  
INVENTOR(S) : Yukio Oshiro Page 1 of 1

It is certified that error appears in the above-identified patent and that said Letters Patent is hereby corrected as shown below:

In the Specification

Column 2, Line 65, "thither" should read --further--

Column 10, Line 7, "engaging pans" should read --engaging parts--

Signed and Sealed this  
Thirty-first Day of March, 2020

Andrei Iancu  
*Director of the United States Patent and Trademark Office*